(12) United States Patent
Fader et al.

(10) Patent No.: US 7,255,090 B2
(45) Date of Patent: Aug. 14, 2007

(54) COMPRESSION IGNITION ENGINE WITH PRESSURE-BASED COMBUSTION CONTROL

(75) Inventors: Hugh Fader, Royal Oak, MI (US); Christopher Warren, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/305,263

(22) Filed: Dec. 15, 2005

(65) Prior Publication Data

US 2007/0137619 A1    Jun. 21, 2007

(51) Int. Cl.
*F02M 7/28* (2006.01)
(52) U.S. Cl. ..................... 123/435; 123/295
(58) Field of Classification Search ................ 123/435, 123/299, 300, 305, 90.15, 406.41, 406.42; 701/103–105; 73/117.3
See application file for complete search history.

(56) References Cited

U.S. PATENT DOCUMENTS

| | | | | |
|---|---|---|---|---|
| 4,760,733 A | * | 8/1988 | Tanaka | 73/35.04 |
| 4,928,653 A | * | 5/1990 | Ohkubo et al. | 123/435 |
| 5,682,856 A | * | 11/1997 | Tomisawa et al. | 123/406.22 |
| 6,138,654 A | | 10/2000 | Pretorius et al. | |
| 6,439,030 B2 | | 8/2002 | Suzuki et al. | |
| 6,508,229 B2 | * | 1/2003 | Miyakubo et al. | 123/305 |
| 6,598,468 B2 | * | 7/2003 | Zur Loye et al. | 73/117.3 |
| 6,820,592 B2 | | 11/2004 | Buck et al. | |
| 6,840,218 B2 | * | 1/2005 | Scholl et al. | 123/435 |
| 6,854,441 B2 | * | 2/2005 | Vermonet et al. | 123/299 |
| 7,000,596 B2 | * | 2/2006 | Zurloye et al. | 123/435 |
| 7,007,664 B2 | * | 3/2006 | Takemoto et al. | 123/305 |
| 7,025,042 B2 | * | 4/2006 | Gray, Jr. | 123/435 |
| 7,073,485 B2 | * | 7/2006 | Truscott et al. | 123/406.22 |
| 7,128,062 B2 | * | 10/2006 | Kuo et al. | 123/568.14 |
| 2005/0125140 A1 | * | 6/2005 | Vermonet et al. | 701/114 |
| 2007/0006842 A1 | * | 1/2007 | Kesse et al. | 123/299 |

FOREIGN PATENT DOCUMENTS

| | | | |
|---|---|---|---|
| EP | 1111360 | | 6/2001 |
| JP | 10-110638 | * | 4/1998 |
| JP | 2001-323832 | * | 11/2001 |

\* cited by examiner

*Primary Examiner*—Hai Huynh
(74) *Attorney, Agent, or Firm*—Allan J. Lippa; Alleman Hall McCoy Russell & Tuttle LLP

(57) ABSTRACT

An internal combustion engine having a plurality of combustion cylinders configured to operate in a compression ignition mode. A pressure sensor is provided to sense pressure within a combustion cylinder of the engine. A combustion control system, including an electronic engine controller, is configured to receive electrical signals from the pressure sensor and, based on such signals, determine a maximum rate of pressure increase occurring in the combustion cylinder during a first time interval. Based on the determined maximum rate of pressure increase, the combustion control system is configured to control one or more charge inputs to the combustion cylinder during a second time interval.

25 Claims, 3 Drawing Sheets

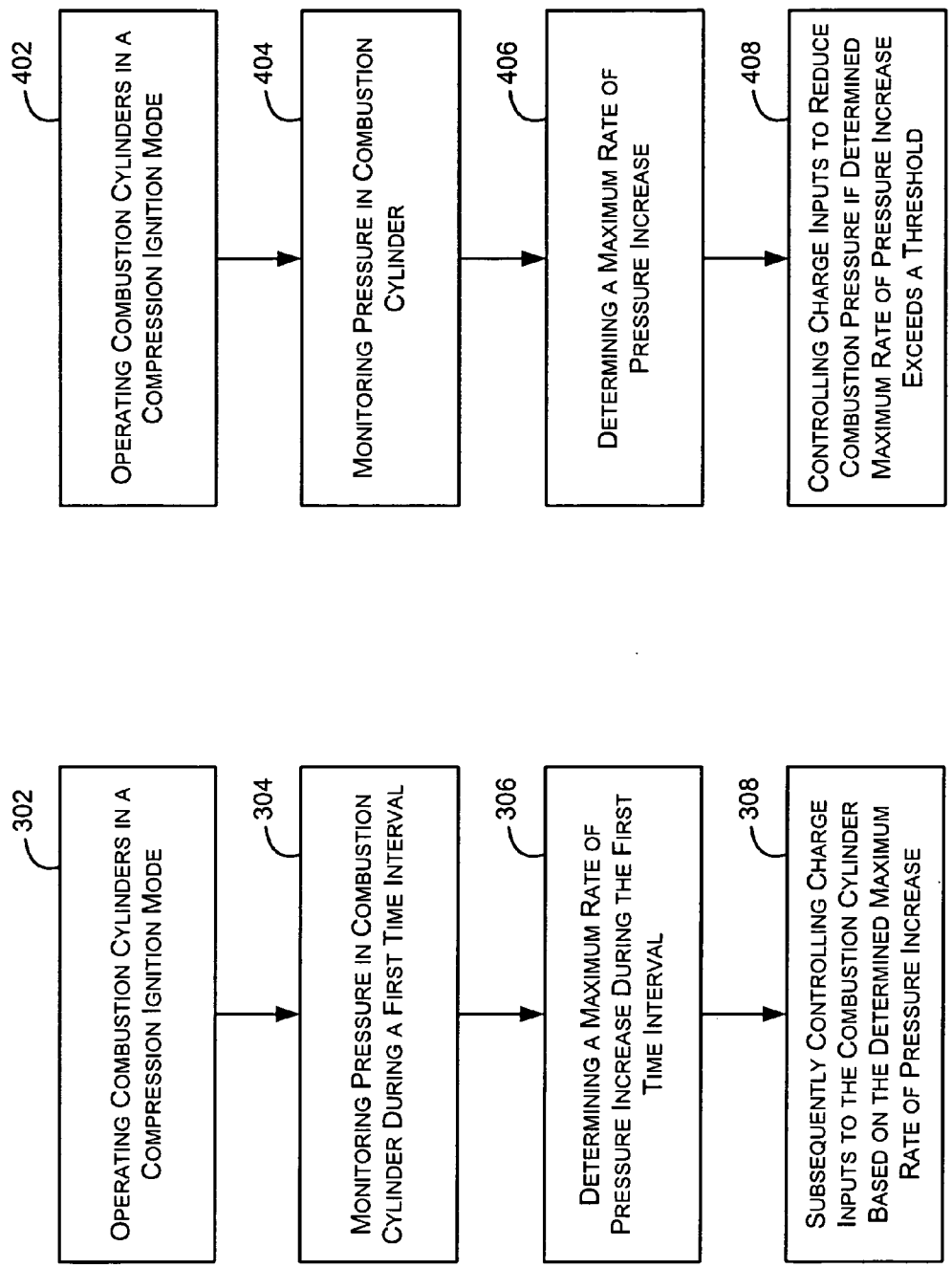

COMPRESSION IGNITION ENGINE WITH PRESSURE-BASED COMBUSTION CONTROL

TECHNICAL FIELD

The present disclosure relates to pressure-based combustion control in compression ignition engines.

BACKGROUND AND SUMMARY

Diesel internal combustion engines experience relatively high combustion pressures relative to other types of engines. High combustion pressures, together with direct injection strategies and high compression ratios, can cause diesel engines to produce an undesirable amount of combustion noise. Various steps may be taken to mitigate combustion noise, including injection timing modification and use of combustion pre-chambers. In many cases, however, steps taken to reduce combustion noise have adverse effects on emissions and/or efficiency.

Because combustion noise is related to combustion pressure, a possible solution to addressing combustion noise involves use of a pressure sensor. Many pressure sensing systems, however, are not suitable for in-vehicle use. For example, laboratory-type instrumentation can provide effective pressure-based combustion control on test engines, though this equipment is too expensive and complicated for use in production vehicles.

U.S. Pat. No. 6,820,592 describes an apparatus in which cylinder pressure may be used as a control input to control fuel injection, for example to ensure that a rate of pressure rise does not exceed a specific value. However, the described control requires use of additional sensors and processing steps to perform pressure-based combustion control. Specifically, the apparatus and method entail evaluation of the absolute maximum of the cylinder pressure gradient and its angular position, and evaluation of relative maxima and their angular positions.

The present disclosure provides for an internal combustion engine having a plurality of combustion cylinders configured to operate in a compression ignition mode. A pressure sensor is provided to sense pressure within a combustion cylinder of the engine.

According to one embodiment, the engine further includes an electronic engine controller and a circuit operatively coupled between the electronic engine controller and the pressure sensor. The circuit is configured to convert electrical signals received from the pressure sensor into a pressure gradient signal indicative of a maximum rate of pressure increase within the combustion cylinder. In response to the pressure gradient signal exceeding a threshold, the electronic engine controller is configured to control charge inputs to the combustion cylinder to reduce the maximum rate of pressure increase in the combustion cylinder for a subsequent combustion cycle.

According to another embodiment, the engine further includes a combustion control system, including an electronic engine controller, which is configured to receive electrical signals from the pressure sensor and, based on such signals, determine a maximum rate of pressure increase occurring in the combustion cylinder during a first time interval. Based on the maximum rate of pressure increase determined in the first time interval, the combustion control system is configured to control one or more charge inputs to the combustion cylinder during a second time interval.

BRIEF DESCRIPTION OF THE DRAWINGS

FIGS. 3 and 4 are exemplary methods for operating an internal combustion engine.

DETAILED DESCRIPTION OF THE DEPICTED EMBODIMENTS

Figure 1:
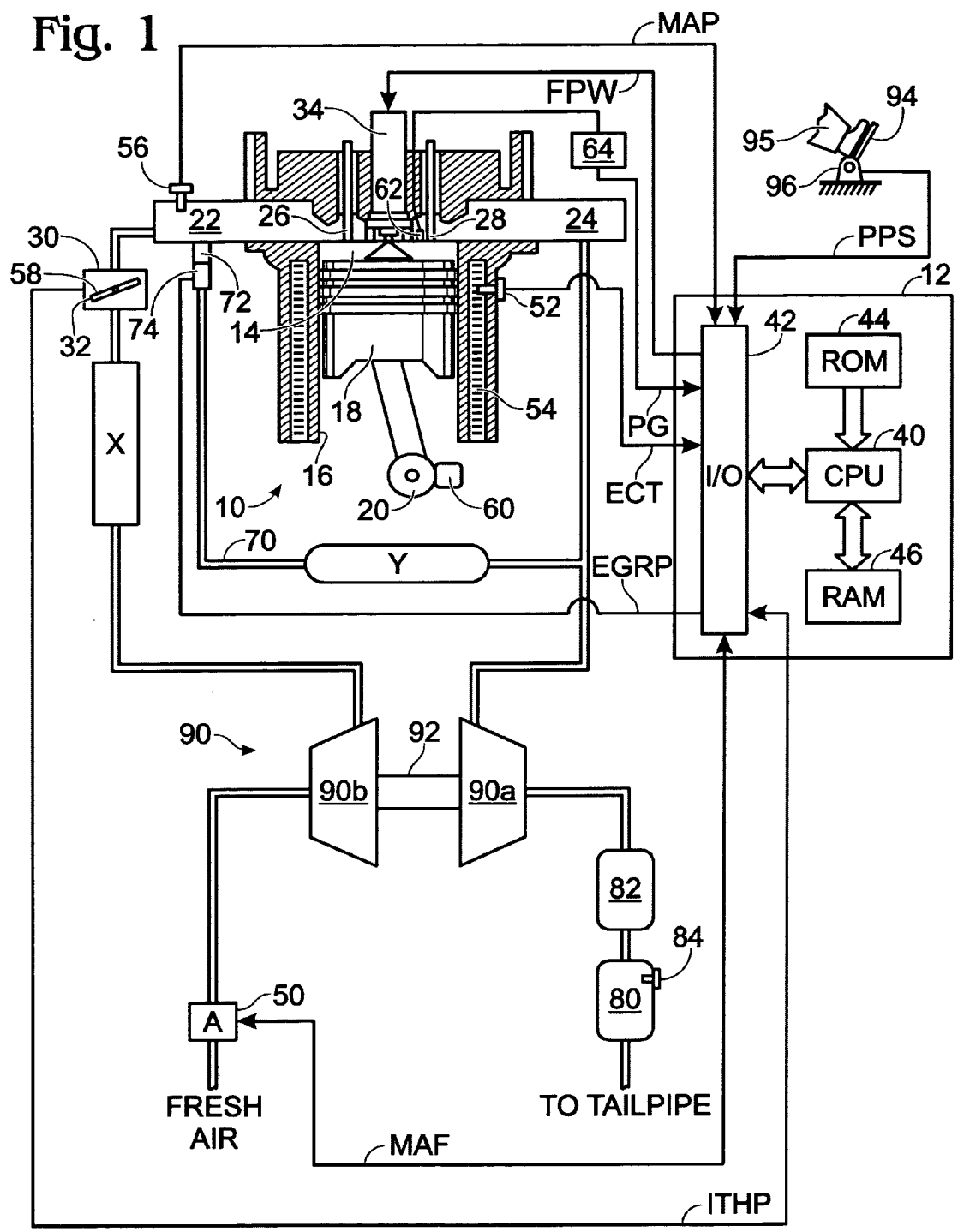
FIG. 1 is a schematic depiction of an exemplary embodiment of a diesel engine.

FIG. 1 shows an example of a diesel internal combustion engine system generally at 10. Specifically, internal combustion engine 10, comprising a plurality of cylinders, one cylinder of which is shown in FIG. 1, is controlled by electronic engine controller 12. Engine 10 includes combustion chamber 14 and cylinder walls 16 with piston 18 positioned therein and connected to crankshaft 20. Combustion chamber 14 communicates with an intake manifold 22 and an exhaust manifold 24 via respective intake valve 26 and exhaust valve 28.

Intake manifold 22 communicates with throttle body 30 via throttle plate 32. In one embodiment, an electronically controlled throttle can be used. In one embodiment, the throttle is electronically controlled to periodically, or continuously, maintain a specified vacuum level in intake manifold 22.

Intake manifold 22 is also shown having fuel injector 34 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). In the case of direct injection engines, as shown in FIG. 1, a high pressure fuel system is used such as a common rail system. However, there are several other fuel systems that could be used as well, including but not limited to EUI, HEUI, etc.

In the depicted embodiment, controller 12 is a conventional microcomputer, also referred to as an electronic engine controller, and includes a microprocessor unit 40, input/output ports 42, electronic memory 44, which may be an electronically programmable memory in this particular example, random access memory 46, and a conventional data bus.

Controller 12 receives various signals from sensors coupled to engine 10, including but not limited to: measurements of inducted mass air flow (MAF) from mass air flow sensor 50 coupled to the air filter [A on FIG. 1] (note that in a diesel engine, the air flow meter is typically read before the compressor; also note that the airflow sensor should be placed before the entrance point for a low pressure EGR (exhaust gas recirculation) loop); engine coolant temperature (ECT) from temperature sensor 52 coupled to cooling jacket 54; a measurement of manifold pressure (MAP) from manifold pressure sensor 56 coupled to intake manifold 22; a measurement of throttle position (TP) from throttle position sensor 58 coupled to throttle plate 32; a profile ignition pickup signal (PIP) from Hall effect sensor 60 coupled to crankshaft 20 indicating engine speed; and a pressure gradient signal (PG). As discussed in more detail below, pressure gradient signal PG may be based on signals obtained from pressure sensor 62 and processed by circuit 64.

Engine 10 may include an exhaust gas recirculation (EGR) system to help lower NOx and other emissions. In the EGR system depicted in FIG. 1, exhaust gas is delivered to intake manifold 22 by an EGR tube 70 communicating with exhaust manifold 24. An EGR valve assembly 72 is located in EGR tube 70. Stated another way, exhaust gas travels from exhaust manifold 24 first through EGR valve assembly 72, and then to intake manifold 22. EGR valve assembly 72 can then be said to be located upstream the intake manifold. There is also optionally an EGR cooler [shown at Y in FIG. 1] placed in EGR tube 70 to cool recirculated exhaust gases before entering the intake manifold. Cooling is typically done using engine water, but and air-to-air heat exchanged could also be used.

Pressure sensor 56 provides a measurement of manifold pressure (MAP) to controller 12. EGR valve assembly 72 has a valve (not shown) for controlling a variable area restriction in EGR tube 70, which thereby controls EGR flow. EGR valve assembly 72 can either minimally restrict EGR flow through tube 70 or completely restrict EGR flow through tube 70.

A vacuum regulator 74 is coupled to EGR valve assembly 72. Vacuum regulator 74 receives actuation signals from controller 12 for controlling the valve position of EGR valve assembly 72. In a preferred embodiment, EGR valve assembly 72 is a vacuum actuated valve. However, any type of flow control valve may be used such as, for example, an electrical solenoid powered valve or a stepper motor powered valve.

Also, lean NOx catalyst or trap 80 and particulate filter 82 are shown coupled in the exhaust path downstream of a compression device 90. Compression device 90 can be a turbocharger or any other such device. Compression device 90 has a turbine 90a coupled in the exhaust manifold 24 and a compressor 90b coupled in the intake manifold 22 via an intercooler [shown at X in FIG. 1], which is typically an air-to-air heat exchanger, but could be water cooled. Turbine 90a is typically coupled to compressor 90b via a drive shaft 92. (This could also be a sequential turbocharger arrangement, single VGT, twin VGTs, or any other arrangement of turbochargers that could be used.)

Further, controller 12 may receive a measurement of a temperature of NOx trap 80 from a temperature sensor 84 associated with NOx trap 80. Alternatively, sensor 84 may be positioned such that it provides an indication of exhaust gas temperature, or exhaust manifold temperature. However, placing sensor 84 adjacent to or within NOx trap 80 instead of adjacent to or within exhaust manifold 24 may allow the temperature of NOx trap 80 to be more accurately determined, as there may be substantial temperature drop in the turbine 90a.

Further, drive pedal 94 is shown along with a driver's foot 95. Pedal position sensor (pps) 96 measures angular position of the driver actuated pedal.

Further, engine 10 may also include exhaust air/fuel ratio sensors (not shown). For example, either a 2-state EGO sensor or a linear UEGO sensor can be used. Either of these can be placed in the exhaust manifold 24, or downstream of devices 80, 82 or 90.

It will be understood that the depicted diesel engine 10 is shown only for the purpose of example, and that the systems and methods described herein may be implemented in or applied to any other suitable engine having any suitable components and/or arrangement of components.

As indicated above, the high combustion pressures arising during operation of a diesel engine can produce undesirable combustion noise in some cases. At other times, even if combustion noise is within an acceptable range, it may be desirable to employ pressure-based combustion control to optimize tradeoffs between combustion noise, efficiency, emissions, etc.

Accordingly, the present disclosure further includes methods and systems for operating an internal combustion engine, and more particularly for effecting control over compression ignition combustion, based on pressure data/signals received from a cylinder pressure sensor. According to one example embodiment, the device/system processes a cylinder pressure sensor signal to determine a maximum rate of pressure rise. This determined maximum rate of pressures rise is an indicator of combustion noise. Based on the determined maximum rate of pressure rise, various controls may be effected over the combustion, including controlling charge inputs to the combustion chambers, as described in more detail below.

Referring still to FIG. 1, sensor 62 may be an in-cylinder piezoelectric sensor configured to provide pressure signals to circuit 64, typically in the form of an electrical charge that varies with the instantaneous pressure in the cylinder. The raw sensor data is received and processed or converted by circuit 64 to produce a pressure gradient signal PG. The pressure gradient signal is based on, or corresponds to, a maximum rate of pressure increase that has occurred in the combustion cylinder during the monitoring period. As explained in more detail below, the circuit may be reset periodically, such that the monitoring period corresponds to combustion cycles of the cylinder. In other words, the circuit may be configured to reset once every four-strokes of piston 18 (the depicted exemplary engine has a four-stroke combustion cycle).

The pressure gradient signal PG may thus indicate, at any given time, the maximum rate of pressure increase that has been experienced in the cylinder during the monitoring period. Electronic engine controller 12 may use this signal as a basis for performing control over various combustion parameters. More particularly, charge inputs to the cylinder may be controlled, such as fuel injections to the cylinder, provision of re-circulated exhaust gas into the cylinder, etc.

Figure 2:
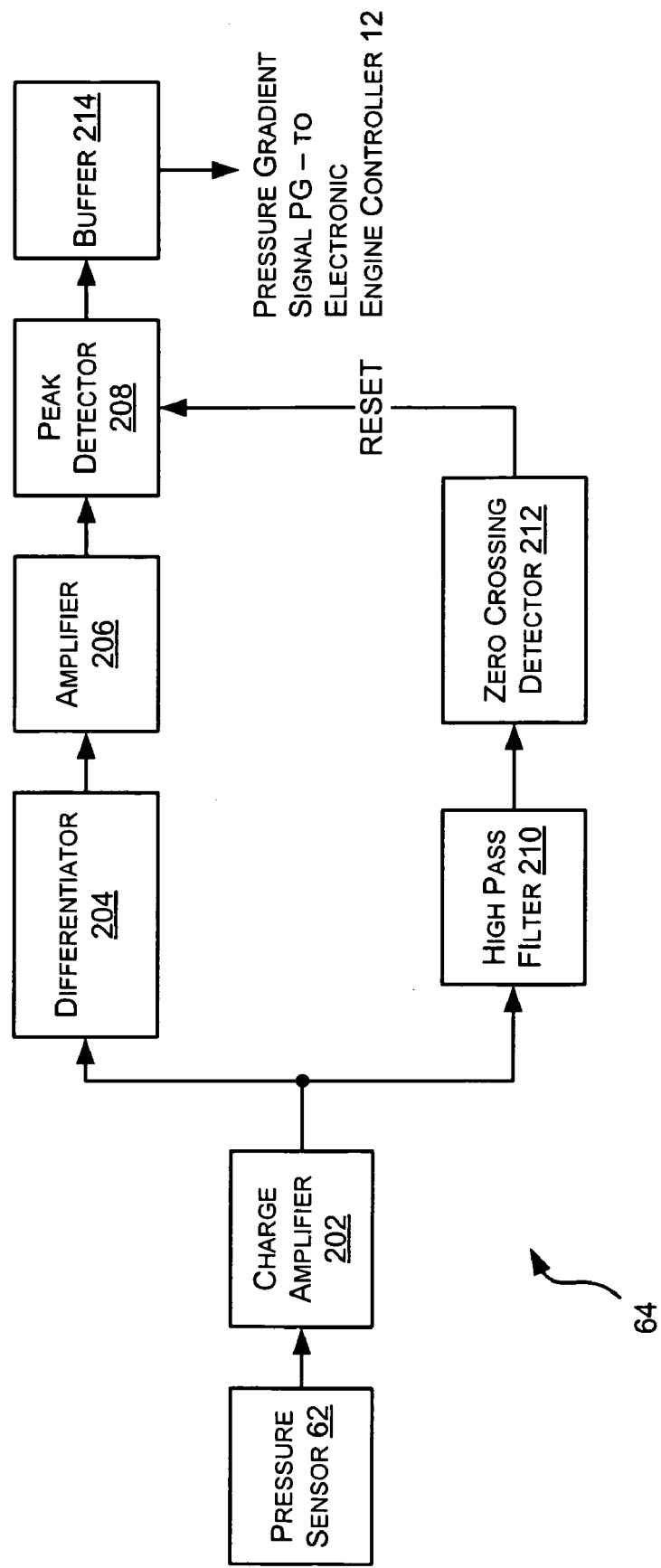
FIG. 2 is an exemplary circuit for processing cylinder pressure signals.

Referring now to schematic block diagram of FIG. 2, the figure shows pressure sensor and circuit 64 in more detail. As previously discussed, sensor 62 may be a piezo-electric pressure sensor configured to monitor pressure inside combustion chamber 14, though other types of pressure sensors may be used in which case suitable signal conditioning would be used in place of charge amplifier 202.

The sensor output is fed into circuit 64, which may include various components such as: (1) a charge amplifier 202 section to amplify the sensor into a high level voltage which may be more suitable for subsequent processing; (2) a differentiator 204 section to convert the amplified pressure signal into a differentiated signal proportional to the rate of change of the pressure; (3) an amplifier 206 section which boosts the amplitude of the differentiated signal to a measurable level; (4) a peak detector 208 section which tracks the maximum level of the amplified rate of change signal until a reset signal is asserted on its reset input; (5) a high pass filter 210 which ensures that the input signal crosses zero volts; (6) a zero crossing detector 212 which provides a digital pulse when the input signal crosses zero with a positive slope, which would occur early in the compression stroke prior to combustion. The output of the zero crossing detector is used to reset the peak detector so that a new maximum rate of pressure rise may be captured for the current combustion cycle; and (7) a buffer 214 section which isolates the output of the peak detector thus protecting it from the load presented by the electronic engine controller 12.

In the present example, circuit 64 is depicted as a separate discrete circuit. Indeed, circuit 64 may be implemented as an analog circuit with analog inputs and outputs, thus providing an inexpensive way to provide pressure-based combustion control. Circuit 64 and electronic engine controller 12 thus collectively function as a combustion control system. In other example embodiments, the circuit may be incorporated into electronic engine controller 12.

Various types of combustion control may be performed based on the pressure gradient signal PG. As indicated above, control over compression ignition combustion may be performed by controlling charge inputs to the combustion cylinders. For example, in a first embodiment, fuel injections are controlled in response to the pressure gradient signal. According to this embodiment, electronic engine controller 12 exerts control over injector 34 (via FPW signal) based on the pressure gradient signal from circuit 64. Examples of fuel injection control include:

1. Modifying timing and/or amount of fuel injections, including modification of fuel injection rate curves;
2. Changing number of injection events per cycle (e.g., adding a pilot injection to reduce combustion pressure and noise), and/or modifying the timing and/or amount of fuel injected during existing injection events;
3. Where multiple injection events are employed, changing the ratio of fuel injected during the injection events (e.g., increasing fuel injected during a pilot injection and decreasing fuel injected during subsequent injection(s));
4. Modifying fuel pressure (e.g., in a common injection rail);
5. Etc.

It should be appreciated that these are intended as examples only, and other fuel injection controls may be performed based on the pressure gradient signal. In many cases, it will be desirable to control fuel injection so as to reduce combustion pressures and thereby reduce noise, vibration and harshness occurring as a result of combustion noise. One example of such a strategy is to control fuel injection so as to reduce combustion noise in the event that the pressure gradient signal exceeds a threshold. The threshold may be dynamic and variable, to account for acceptable levels of combustion noise under various different operating conditions. For example, the threshold pressure gradient value for performing a given control action might vary with engine speed and load, or with other factors/conditions.

Exhaust gas can also be a charge input to the combustion cylinders. Exhaust gas may be drawn into the combustion cylinders via external exhaust gas recirculation (EGR) (e.g., via EGRP signals applied to control EGR valve assembly 72), or internally as a result of valve overlapping or other control exerted over operation of the intake and exhaust valves of the cylinder (e.g., valves 26 and 28). In any case, controlling the amount of exhaust gas that is drawn into the combustion cylinders may affect combustion pressure and combustion noise. Specifically, adding exhaust gas dilutes the cylinder charge and thus reduces combustion pressures.

Accordingly, the pressure gradient signal PG may be used by electronic engine controller 12 as a factor in controlling EGR. Specifically, electronic engine controller may control valve operation to vary internal EGR. Valve timing, lift, etc. of valves 26 and 28 may be controlled using cam profile switching, variable cam timing, electro-hydraulic or electromechanical valve actuation (EVA), etc. External EGR systems, such as that depicted in FIG. 1, may also be controlled by controller 12 based on the pressure gradient signal. As with the fuel injection control described above, the pressure-based control of EGR may be initiated in response to a threshold, which may be dynamically variable.

In addition, pressure may be employed to control engine cooling systems. For example, the pressure gradient signal and circuit may be used to trigger control of coolant flow from a controllable water pump, and/or speed or activation/deactivation of the engine cooling fan.

In the systems and method embodiments described herein, it may in some cases be desirable to employ the described pressure-based control system to balance combustion noise with considerations of efficiency and emissions. Controlling fuel injections to reduce combustion noise may be accompanied by increased emissions or a decrease in fuel economy. By providing an improved and efficient way of assessing combustion noise, circuit 64 and pressure gradient signal PG enable improved control over combustion noise and optimization of combustion noise tradeoffs with efficiency and emissions.

As indicated above, the maximum rate of pressure increase may be monitored within periods or intervals. In such a case, the output of circuit 64 (i.e., pressure gradient signal) PG is indicative of the highest rate of pressure increase experienced since the beginning of the interval. High pass filter 210 and zero crossing detector 212 thus constitute a reset mechanism or subsystem that produces reset signals which cause the monitoring intervals to be equal in duration to a combustion cycle of the engine. During the engine combustion cycle, cylinder pressure is typically relatively lowing during intake, begins to rise during the compression stroke and is at a maximum during ignition of the combustion gases during the power stroke. High pass filter 210 filters out low frequency signals so that the processed signal crosses a zero reference value at a point early during the compression stroke. Zero crossing detector 212 detects the positive-going zero crossing of the signal and in turn produces a reset pulse which resets the peak detector. This allows the peak detector to obtain a new maximum pressure gradient signal for the subsequent interval.

Combustion control in the described systems and methods typically is performed so that the maximum pressure gradient signal determined in a first interval, such as a combustion cycle, forms the basis for subsequently performed combustion control. The subsequent control can be control over a subsequent charge input to the combustion cylinder (e.g., fuel injection control, EGR control, etc.). The control can be effected during the next combustion cycle, during a subsequent predefined interval, or at any other time subsequent to the determination of the pressure gradient signal PG. In some embodiments, use of intervals such as combustion cycles, allows for efficient pressure-based combustion control to be performed without requiring shaft encoders, angle sensors, or other added sensors or processing steps.

FIG. 3 depicts an exemplary method of operating an internal combustion engine, such as engine 10. At 302, the method includes operating combustion cylinders in a compression ignition mode. At 304, the method includes monitoring pressure in combustion cylinder during a first time interval. A pressure sensor such as that discussed with reference to FIGS. 1 and 2 may be employed.

At 306, the method includes determining a maximum rate of pressure increase occurring in the combustion cylinder during the first time interval. This may be performed using a circuit such as that discussed above with reference to FIGS. 1 and 2. At 308, the method includes subsequently controlling charge inputs to the combustion cylinder based on the determined maximum rate of pressure increase.

Various intervals may be employed. As discussed above, it may be convenient or desirable in certain applications to use combustion cycles for the time intervals of steps 304 and 306. For example, the method may be implemented so that, based on the maximum rate of pressure increase detected in a particular combustion cycle, charge inputs such as fuel injections, EGR, etc. are controlled at a later time, such as during one or more subsequent combustion cycles. Control of charge inputs to the combustion cylinders may be implemented as discussed above with reference to FIGS. 1 and 2.

FIG. 4 depicts another exemplary method of operating an internal combustion engine. At 402, the method includes operating combustion cylinders in a compression ignition mode. At 404, the method includes monitoring pressure in combustion cylinder. A pressure sensor such as that discussed with reference to FIGS. 1 and 2 may be employed.

At 406, the method includes determining a maximum rate of pressure increase. This may be performed using a circuit such as that discussed above with reference to FIGS. 1 and 2. At 408, the method includes controlling charge inputs to reduce combustion pressure if determined maximum rate of pressure increase exceeds a threshold. Control of charge inputs to the combustion cylinders may be implemented as discussed above with reference to FIGS. 1 and 2. Also, as discussed above, the threshold may be dynamically variable and selected based on operating conditions to optimize combustion noise and emissions tradeoffs, and tradeoffs with fuel economy.

According to yet another embodiment, the pressure-based control described herein may be employed in spark ignition modes. Specifically, the pressure sensor and circuit of FIGS. 1 and 2 may be employed in spark ignition engines to detect knock and/or harsh combustion. The methods described with reference to FIGS. 3 and 4 may be modified for spark ignition modes, and so pressure signals such as pressure gradient PG are used to control spark timing and other combustion controls.

It will be appreciated that the embodiments and method implementations disclosed herein are exemplary in nature, and that these specific examples are not to be considered in a limiting sense, because numerous variations are possible. The subject matter of the present disclosure includes all novel and nonobvious combinations and subcombinations of the various intake configurations and method implementations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. An internal combustion engine, comprising:
   a diesel fuel injector;
   a plurality of combustion cylinders configured to operate in a compression ignition mode, in which combustion of air and diesel fuel from the diesel fuel injector is performed via compression and without aid of a spark;
   a pressure sensor operatively coupled to one of the combustion cylinders and configured to sense pressure within such cylinder;
   an electronic engine controller; and
   a circuit operatively coupled between the pressure sensor and the electronic engine controller, the circuit being configured to convert electrical signals received from the pressure sensor into a pressure gradient signal indicative of a maximum rate of pressure increase within the combustion cylinder, and where, in response to the pressure gradient signal exceeding a threshold, the electronic engine controller is configured to control charge inputs to the combustion cylinder so as to reduce the maximum rate of pressure increase in the combustion cylinder for a subsequent combustion cycle.

2. The engine of claim 1, where the circuit includes a differentiator and a peak detector coupled within an electrical pathway extending between the pressure sensor and the electronic engine controller, the peak detector being disposed electrically between the differentiator and the electronic engine controller.

3. The engine of claim 2, where the circuit is configured to reset the peak detector at least once for every combustion cycle of the combustion cylinder.

4. The engine of claim 3, where the circuit is configured to generate a reset signal to reset the peak detector based on output received from the pressure sensor.

5. The engine of claim 4, where the circuit includes a high pass filter and a zero crossing detector configured to generate the reset signal based on output received from the pressure sensor.

6. The engine of claim 1, where the electronic engine controller is configured to issue a control signal to vary operation of a fuel injector for the combustion cylinder in response to the pressure gradient signal exceeding the threshold.

7. The engine of claim 6, where the electronic engine controller is configured to issue a control signal to vary exhaust gas recirculation for the combustion cylinder in response to the pressure gradient signal exceeding the threshold.

8. The engine of claim 6, where the control signal is configured to change a number of combustion cycle injection events of the diesel fuel injector.

9. The engine of claim 6, where the control signal is configured to cause variation of relative amounts of diesel fuel injected during multiple injection events occurring in a combustion cycle.

10. The engine of claim 1, where the electronic engine controller is configured to issue a control signal to vary exhaust gas recirculation for the combustion cylinder in response to the pressure gradient signal exceeding the threshold.

11. The engine of claim 1, where the pressure sensor is a piezoelectric pressure sensor.

12. The engine of claim 1, where the threshold is dynamic and varies with operating conditions of the engine.

13. The engine of claim 1, where the circuit is configured to receive analog inputs from the pressure sensor and where the pressure gradient signal is analog.

14. An internal combustion engine, comprising:
   a diesel fuel injector;
   a plurality of combustion cylinders configured to operate in a compression ignition mode, in which combustion of air and diesel fuel is performed via compression and without aid of a spark;
   a pressure sensor operatively coupled to one of the combustion cylinders and configured to sense pressure within such combustion cylinder;

a combustion control system, including an electronic engine controller, which is operatively coupled with the combustion cylinder and configured to:

receive electrical signals from the pressure sensor and, based on such signals, determine a maximum rate of pressure increase occurring in the combustion cylinder during a first time interval; and based on the maximum rate of pressure increase determined in the first time interval, control one or more charge inputs to the combustion cylinder during a second time interval.

15. The engine of claim 14, where the plurality of combustion cylinders are configured to operate in four stroke combustion cycles, and where the first time interval is one of the four stroke combustion cycles and the second time interval is another subsequent one of the four stroke combustion cycles.

16. The engine of claim 15, where the combustion control system is configured to control diesel fuel injection into the combustion cylinder based on the maximum rate of pressure increase determined in the first time interval.

17. The engine of claim 15, where the combustion control system is configured to control how much recirculated exhaust gas is permitted to enter the combustion cylinder based on the maximum rate of pressure increase determined in the first time interval.

18. A method of operating a diesel internal combustion engine, comprising:

operating a plurality of combustion cylinders in a compression ignition mode where charge for combustion is provided via diesel fuel and air and without aid of a spark;

monitoring pressure in one of the combustion cylinders with a pressure cylinder;

based on monitored pressure in the combustion cylinder, determining a maximum rate of pressure increase occurring in the combustion cylinder during a first time interval; and based on the maximum rate of pressure increase determined in the first time interval, controlling one or more charge inputs to the combustion cylinder during a second time interval.

19. The method of claim 18, where operating the plurality of combustion cylinders is performed so that the combustion cylinders are operated in four stroke combustion cycles, and where the first time interval is one of the four stroke combustion cycles and the second time interval is another subsequent one of the four stroke combustion cycles.

20. The method of claim 19, where controlling one or more charge inputs to the combustion cylinder includes controlling diesel fuel injection into the combustion cylinder.

21. The method of claim 19, where controlling one or more charge inputs to the combustion cylinder includes controlling how much recirculated exhaust gas is permitted to enter the combustion cylinder.

22. The method of claim 18, where controlling one or more charge inputs to the combustion cylinder includes controlling diesel fuel injection into the combustion cylinder.

23. The method of claim 18, where controlling one or more charge inputs to the combustion cylinder includes controlling how much recirculated exhaust gas is permitted to enter the combustion cylinder.

24. The method of claim 18, further comprising, upon determining that the maximum rate of pressure increase occurring in the combustion cylinder exceeds a threshold during the first time interval, controlling one or more subsequent charge inputs to the combustion cylinder to reduce the maximum rate of pressure increase.

25. The method of claim 24, where the threshold is dynamic and depends on operating conditions of the internal combustion engine.

* * * * *